US011841075B2

(12) United States Patent
Oh et al.

(10) Patent No.: US 11,841,075 B2
(45) Date of Patent: Dec. 12, 2023

(54) OIL STORAGE STRUCTURE OF TRANSMISSION CASE

(71) Applicant: JATCO Ltd, Fuji (JP)

(72) Inventors: Hyungho Oh, Mokpo Jeollanam-do (KR); Yongwoo Jeon, Incheon (KR); Solae Gim, Seoul (KR); Taekjin Lee, Seoul (KR); Jaeyoung Kim, Seoul (KR); Jaemin Seo, Hwaseong Gyeonggi-do (KR); Yonghun Yoon, Seoul (KR)

(73) Assignee: JATCO LTD, Fuji (JP)

( * ) Notice: Subject to any disclaimer, the term of this patent is extended or adjusted under 35 U.S.C. 154(b) by 115 days.

(21) Appl. No.: 17/186,071

(22) Filed: Feb. 26, 2021

(65) Prior Publication Data

US 2021/0277990 A1    Sep. 9, 2021

(30) Foreign Application Priority Data

Mar. 3, 2020 (JP) .................................. 2020-035544

(51) Int. Cl.
*F16H 57/04* (2010.01)
*F01M 11/00* (2006.01)

(52) U.S. Cl.
CPC ..... *F16H 57/0452* (2013.01); *F01M 11/0004* (2013.01); *F01M 2011/002* (2013.01); *F01M 2011/007* (2013.01)

(58) Field of Classification Search
CPC ............ F16H 57/0452; F01M 11/0004; F01M 2011/002; F01M 2011/007; F16N 31/00; F16N 31/002
See application file for complete search history.

(56) References Cited

U.S. PATENT DOCUMENTS

| | | | | |
|---|---|---|---|---|
| 1,281,548 A | * | 10/1918 | Name not available | |
| | | | | F01M 11/0004 |
| | | | | 184/106 |
| 1,365,438 A | * | 1/1921 | Adamson | F01M 11/065 |
| | | | | 220/675 |
| 1,421,440 A | * | 7/1922 | Fisher | B01D 35/02 |
| | | | | 184/6.24 |
| 2,618,351 A | * | 11/1952 | Giacosa | F01M 11/0004 |
| | | | | 180/69.1 |
| 2,796,239 A | * | 6/1957 | John | F28D 9/0037 |
| | | | | 165/DIG. 356 |
| 5,103,782 A | * | 4/1992 | Matsui | F01M 11/0004 |
| | | | | 184/106 |

(Continued)

FOREIGN PATENT DOCUMENTS

| | | | | |
|---|---|---|---|---|
| JP | 2012-154298 A | | 8/2012 | |
| WO | WO-2008072416 A1 | * | 6/2008 | ......... F01M 11/0004 |
| WO | WO-2014038509 A1 | * | 3/2014 | ............. B32B 25/02 |

*Primary Examiner* — Minh Truong
(74) *Attorney, Agent, or Firm* — Foley & Lardner LLP (57) ABSTRACT

The oil storage structure includes an oil pan that closes a lower opening of the transmission case and forms an oil pool in a lower space inside the transmission case, and a strainer having a suction port for oil located in the oil pool. The suction port for the oil is provided so as to face a bottom wall portion of the oil pan with a gap in between, and the bottom wall portion of the oil pan is provided with a protruding portion protruding toward the suction port, with the protruding portion being formed in a direction across the suction port as viewed from the bottom wall portion.

7 Claims, 7 Drawing Sheets

(56) References Cited

U.S. PATENT DOCUMENTS 5,465,692 A * 11/1995 Uraki ................. F01M 11/0004
                                                          184/106
2015/0252696 A1* 9/2015 Taguchi ............. F01M 11/0004
                                                          123/198 E

* cited by examiner

OIL STORAGE STRUCTURE OF TRANSMISSION CASE

TECHNICAL FIELD

The present invention relates to an oil storage structure of a transmission case.

BACKGROUND ART

Automatic transmission fluid (ATF, hereinafter simply referred to as "oil") is stored inside a transmission case of a vehicle, and is used for lubrication and cooling of the parts forming a transmission mechanism housed in the transmission case, for torque transmission, and the like.

An opening is provided in a lower portion of the transmission case, and an oil pan is attached to close the opening. The oil pan forms an oil pool for storing oil that has fallen from the parts forming the transmission mechanism and oil that has fallen along the inner wall of the transmission case. A strainer is provided in the oil pool to filter the oil in the oil pool. A suction port is provided in a lower portion of the strainer. When an oil pump is operated, oil is sucked up from the suction port to the strainer (see JP2012-154298A).

SUMMARY OF INVENTION

The suction port of the strainer is arranged so as to face a bottom wall portion of the oil pan with a gap in between. When the bottom wall portion of the oil pan collides with a curb or the like and is deformed as a result of the vehicle riding on the curb, the bottom wall portion might come into contact with the suction port of the strainer, resulting in a reduced opening area of the suction port.

In the oil storage structure of the transmission case, the opening area of the suction port needs to be secured, even when the bottom wall portion of the oil pan deforms to come into contact with the suction port of the strainer.

An oil storage structure of a transmission case according to an aspect of the present invention includes:
- an oil pan that closes a lower opening of the transmission case and forms an oil pool in a lower space inside the transmission case; and
- a strainer having a suction port for oil located in the oil pool, in which the suction port for the oil is provided so as to face a bottom wall portion of the oil pan with a gap in between, and
- the bottom wall portion of the oil pan is provided with a protruding portion protruding toward the suction port, with the protruding portion being formed in a direction across the suction port as viewed from the bottom wall portion.

According to the above aspect, when the bottom wall portion of the oil pan collides with a curb or the like and is deformed, the protruding portion protruding from the bottom wall portion toward the suction port comes into contact with the suction port and pushes the suction port upward. The suction port thus deforms in the direction away from the bottom wall portion. As a result, the distance between the suction port and the bottom wall portion is secured, and the opening area where the suction port sucks oil can be secured.

DESCRIPTION OF EMBODIMENTS

Figure 1:
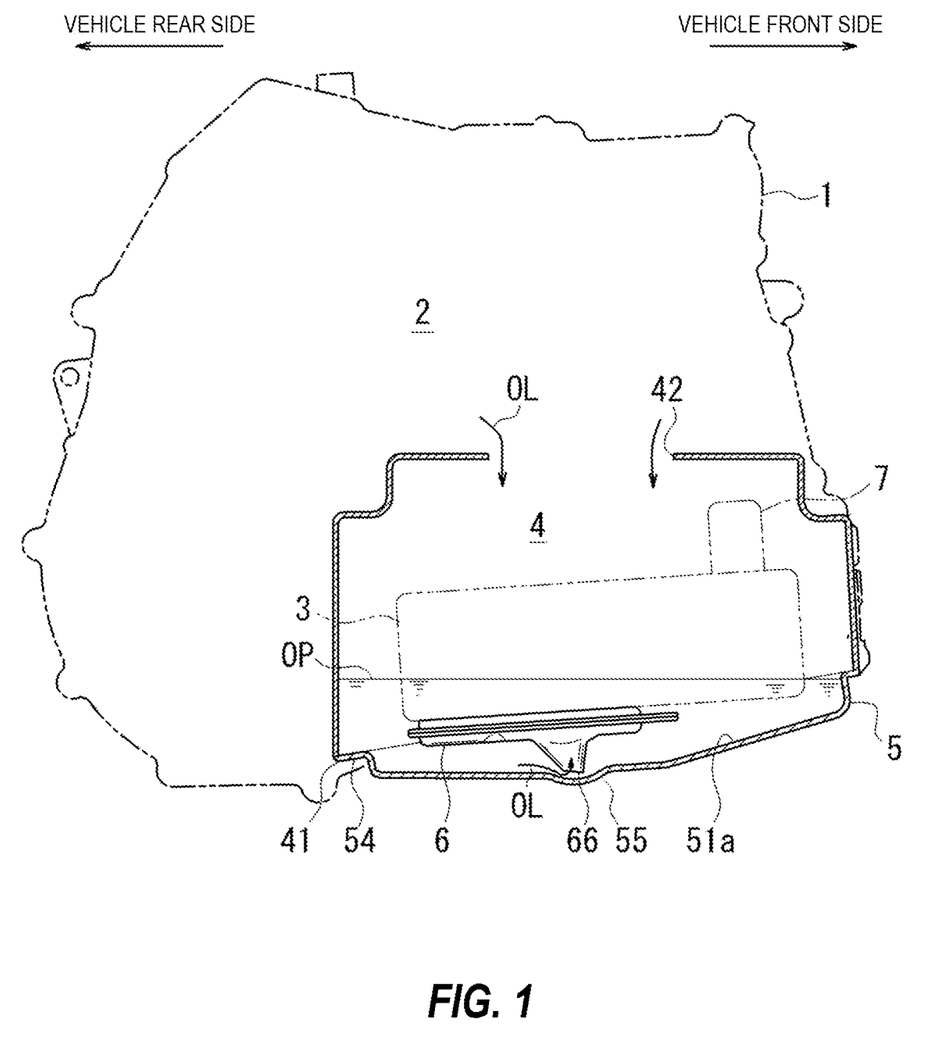
FIG. 1 is a diagram illustrating an internal configuration of a transmission case.

FIG. 1 is a diagram illustrating a schematic configuration inside a transmission case 1. In FIG. 1, configurations other than the main components of an embodiment are schematically illustrated by virtual lines. Furthermore, in FIG. 1, the right side of the drawing is the front side of the vehicle, and the left side of the drawing is the rear side of the vehicle.

As illustrated in FIG. 1, an accommodation chamber 2 that accommodates parts (not illustrated), such as a pulley, forming a transmission mechanism is formed in an upper portion of the transmission case 1, and a valve chamber 4 that accommodates a control valve body 3 is formed in a lower portion of the transmission case 1. The lower portion of the valve chamber 4 is open, and this lower opening 41 is closed by an oil pan 5.

Inside the transmission case 1, oil OL is accommodated that is used for lubricating and cooling the parts accommodated in the accommodation chamber 2, as well as for torque transmission or the like.

In the valve chamber 4, an oil pool OP for storing the oil OL is formed by wall surfaces of the valve chamber 4 and the oil pan 5 that closes the lower opening 41 of the valve chamber 4.

A strainer 6 for filtering the oil OL is attached to the lower side of the control valve body 3, and an oil pump 7 for sucking the oil OL is attached to the upper side.

When the oil pump 7 is operated, the oil OL is sucked up from the oil pool OP, filtered by the strainer 6, and sucked into the oil pump 7. The oil OL is pressurized by the oil pump 7 and then is supplied to the control valve body 3. The control valve body 3 regulates the pressure of the supplied oil OL and the resultant oil OL is supplied to a transmission mechanism inside the accommodation chamber 2 via an oil path (not illustrated).

An upper opening 42 in communication with the accommodation chamber 2 is provided at the upper end of the valve chamber 4. The oil OL supplied to the transmission mechanism either falls directly from the transmission mechanism or travels along the wall surface of the accommodation chamber 2 and returns to the valve chamber 4 through the upper opening 42 to be stored in the oil pool OP.

Although not illustrated or elaborated in the figure, the inside of the control valve body 3 is provided with a hydraulic pressure control circuit including a regulator valve (pressure regulating valve) that regulates the discharge pressure of the oil pump 7 to a predetermined pressure, oil paths through which the oil OL flows, a spool for switching between the flow paths through which the oil OL flows, a pressure regulating valve for adjusting the pressure of the oil OL acting on the transmission mechanism, and the like.

Figure 2A:
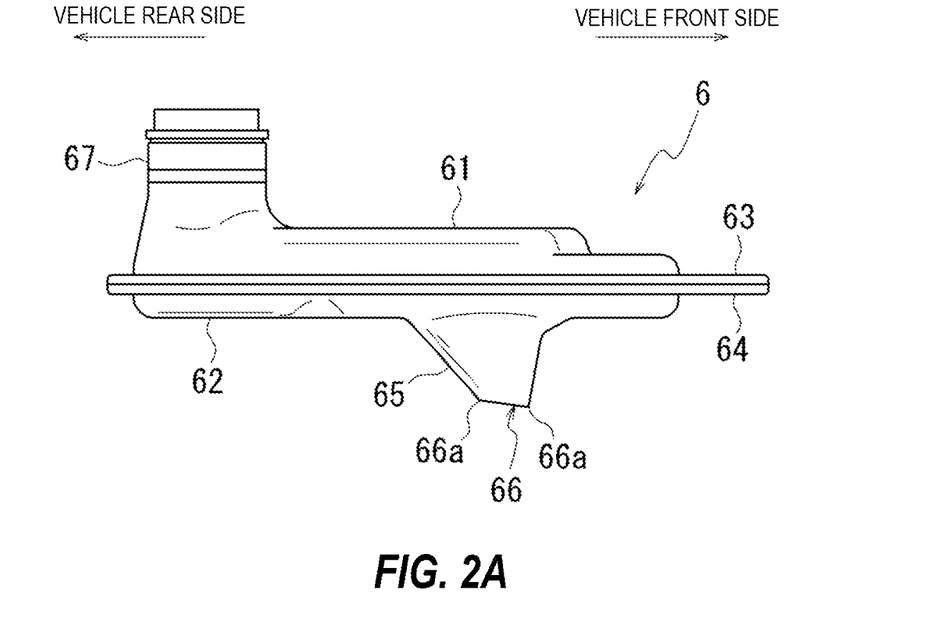
FIG. 2A is a side view of a strainer.
Figure 2B:
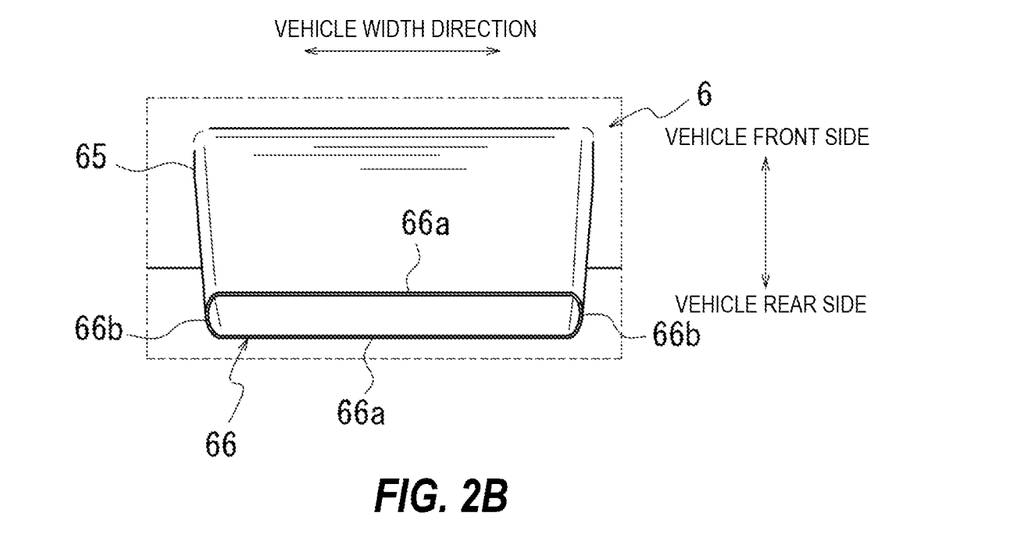
FIG. 2B is a diagram illustrating a suction port of the strainer as viewed from below.

FIG. 2A is a side view of the strainer 6, and FIG. 2B is a diagram illustrating a suction port 66 of the strainer 6 as viewed from below.

As illustrated in FIG. 2A, the strainer 6 includes an upper case 61 and a lower case 62. Flanges 63 and 64 are formed on the outer circumference edges of the lower portion of the upper case 61 and the upper portion of the lower case 62, respectively, and the upper case 61 and the lower case 62 are joined to each other with their flanges 63 and 64 overlapping. Although not illustrated, a filter such as a non-woven fabric for filtering the oil OL is sandwiched between the overlapped flanges 63 and 64.

A suction pipe 65 for sucking up the oil OL is provided in the lower portion of the lower case 62. The suction pipe 65 is provided so as to project downward from the lower case 62, and the suction port 66 opens at the tip of the suction pipe 65.

The upper case 61 has an upper portion provided with an outflow pipe 67 for the oil OL. The outflow pipe 67 and the suction pipe 65 are arranged so as to be offset in a vehicle front-rear direction. The outflow pipe 67 is connected to the oil pump 7 (see FIG. 1), and the oil OL sucked up from the suction port 66 and filtered by the filter (not illustrated) inside the strainer 6 passes through the outflow pipe 67 to be supplied to the oil pump 7.

As illustrated in FIG. 2B, the suction port 66 is a rectangular opening with rounded corners as viewed from below, and has long sides 66a extending linearly, and short sides 66b curved in a semicircular shape. The suction port 66 is arranged so to have the long sides 66a extending in a vehicle width direction of the vehicle and the short sides 66b extending in the vehicle front-rear direction. The suction port 66 may have a simple rectangular shape or an elliptical shape such as an ellipse. As illustrated in FIG. 2A, the suction port 66 is inclined to extend obliquely upward from the long side 66a on the vehicle front side toward the long side 66a on the vehicle rear side.

Figure 3:
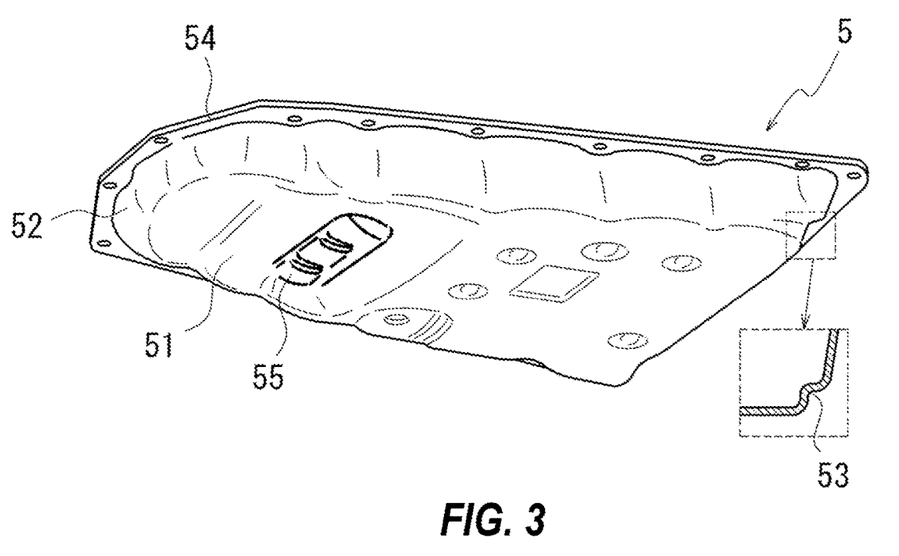
FIG. 3 is a perspective view of an oil pan as viewed from below.

FIG. 3 is a perspective view of the oil pan 5 as viewed from below.

Figure 4:
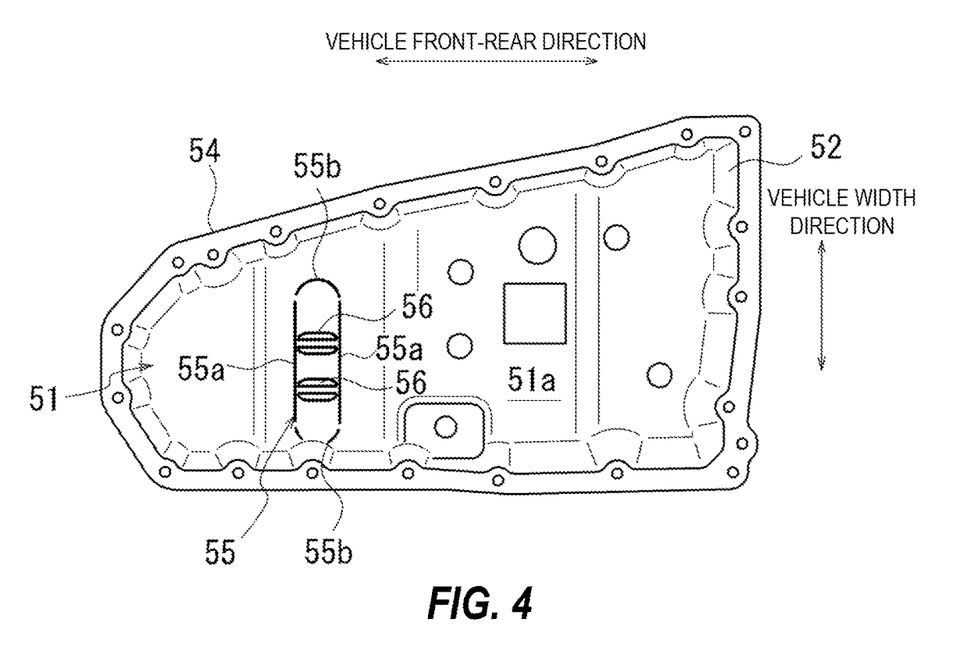
FIG. 4 is a top view of the oil pan.

FIG. 4 is a top view of the oil pan 5.

Figure 5:
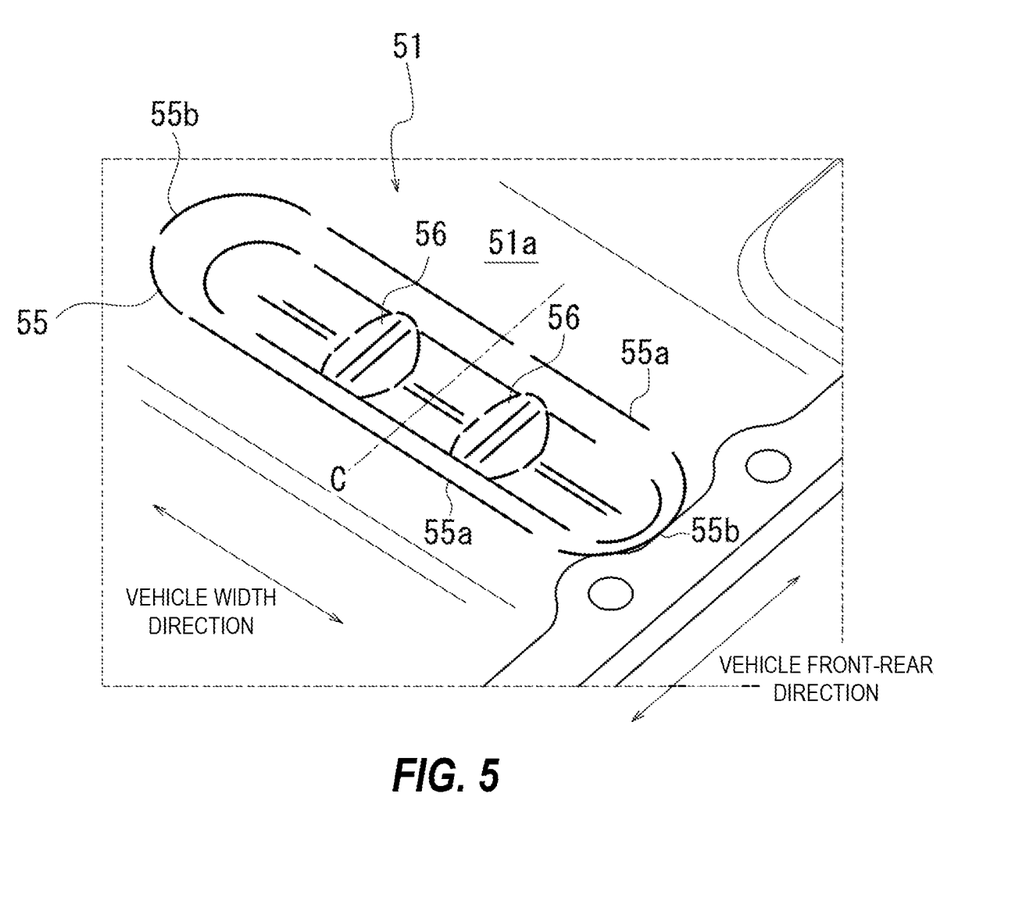
FIG. 5 is an enlarged view of a facing portion of the oil pan.

FIG. 5 is an enlarged view of a facing portion 55 of the oil pan 5.

As illustrated in FIG. 3, the oil pan 5 includes a plate-shaped bottom wall portion 51 and a circumferential wall portion 52 that surrounds the outer circumference of the bottom wall portion 51. The circumferential wall portion 52 is connected to the outer circumference of the bottom wall portion 51 at the lower end. In FIG. 3, a cross-sectional view of a portion surrounded by a broken line is illustrated, and a recessed portion 53 in which the wall surface of the circumferential wall portion 52 is recessed inward is formed in the vicinity of the lower end of the circumferential wall portion 52. The recessed portion 53 is formed over the entire circumference of the circumferential wall portion 52.

A flange 54 is formed at the upper end of the circumferential wall portion 52. As illustrated in FIG. 1, the flange 54 serves as a mating surface with the lower opening 41 of the transmission case 1. The flange 54 is attached to the lower opening 41 of the transmission case 1 with bolts or the like.

In a state where the oil pan 5 is attached to the transmission case 1, an upper surface 51a of the bottom wall portion 51 faces the suction port 66 of the strainer 6 with a gap in between. The portion of the bottom wall portion 51 overlapping with the suction port 66 as viewed from the above is hereinafter referred to as a "facing portion 55". The facing portion 55 bulges in the direction away from the suction port 66, that is, downward. As a result, the bottom surface of the oil pool OP formed by the upper surface 51a of the bottom wall portion 51 is depressed to be deepened at the facing portion 55. Thus, the suction port 66 is adjusted to be located in the oil pool OP even when the oil pool OP moves as the vehicle moves.

As illustrated in FIG. 4, the facing portion 55 has a rectangular shape with rounded corners corresponding to the shape of the suction port 66, with its straight long sides 55a arranged to extend in the vehicle width direction and its short sides 55b arranged to extend in the vehicle front-read direction. The short sides 55b are curved in a semicircular shape.

The facing portion 55 may have any size as long as it overlaps with the suction port 66 as viewed from above, and may be formed to be larger than the opening area of the suction port 66, for example. Furthermore, similarly to the suction port 66, the facing portion 55 may have a mere rectangular shape or an elliptical shape such as an ellipse.

As illustrated in FIG. 5, the facing portion 55 has two protruding portions 56 protruding from a surface of the facing portion 55 on the side of the upper surface 51a. Each of the protruding portions 56 extends in the vehicle front-rear direction, and is formed so as to extend from the long side 55a on the vehicle front side to the long side 55a on the vehicle rear side of the facing portion 55. The two protruding portions 56 are formed on both sides of a center C of the facing portion 55 in the longer side direction while each being separated from the center C in the longer side direction.

The protruding portions 56 may be formed integrally with the facing portion 55 by press molding, or may be formed as a bead raised on the surface of the facing portion 55 by welding or the like. In a state where the oil pan 5 is attached to the transmission case 1, the protruding portions 56 formed on the facing portion 55 face the suction port 66 of the strainer 6.

Figure 6:
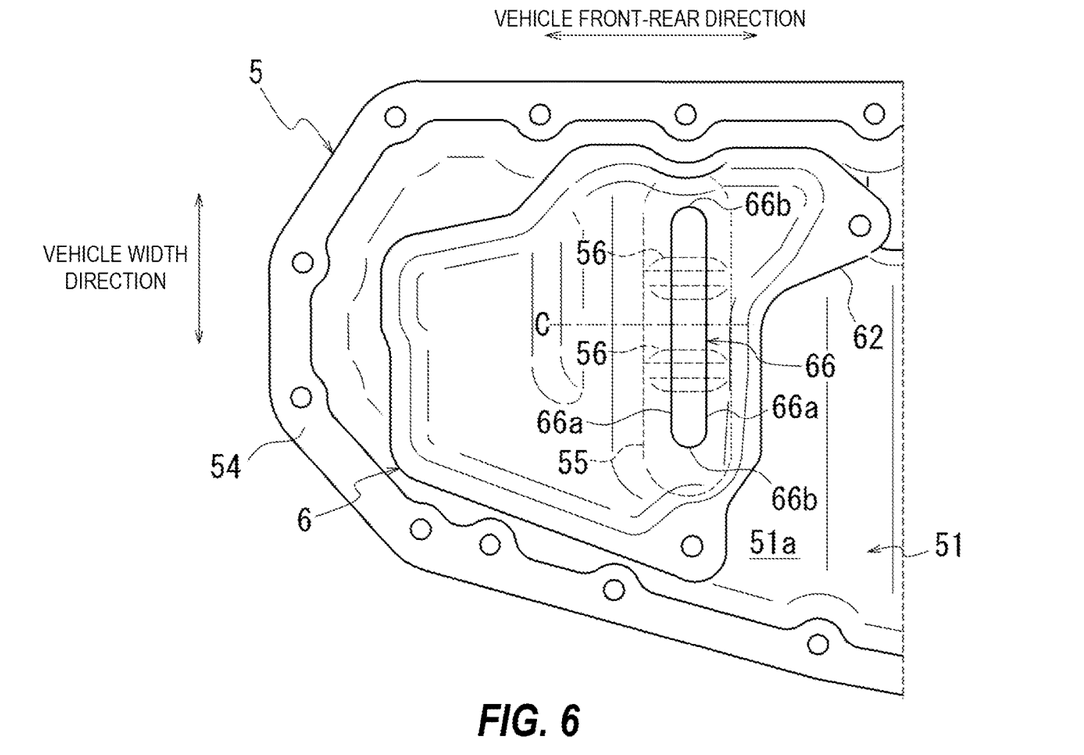
FIG. 6 is a diagram for explaining the positional relationship between the facing portion of the oil pan and the suction port of the strainer.

FIG. 6 is a diagram illustrating the positional relationship between the facing portion 55 of the oil pan 5 and the suction port 66 of the strainer 6. FIG. 6 illustrates a state in which the strainer 6 and the oil pan 5 are viewed from above with the oil pan 5 attached to the transmission case 1, and with the strainer 6 only having the lower case 62 illustrated for the sake of easier understanding. Furthermore, the facing portion 55 of the oil pan 5 is illustrated by a virtual line. As described above, the suction port 66 of the strainer 6 overlaps with the facing portion 55 of the oil pan 5 as viewed from the above or below, and in the illustrated example, the center C of the suction port 66 in the longer side direction matches the center C of the facing portion 55 in the longer side direction.

As illustrated in FIG. 6, as viewed from the above, each of the protruding portions 56 formed on the facing portion 55 is arranged across the suction port 66. Specifically, the protruding portion 56 extends across the suction port 66 in the shorter side direction and crosses each of the long side 66a on the vehicle front side and the long side 66a on the vehicle rear side of the suction port 66 opposite to each other. Furthermore, the two protruding portions 56 face the suction port 66 at positions on both sides of the center C of the suction port 66 in the longer side direction while being spaced apart from the center C in the longer side direction.

Furthermore, as described above, while the facing portion 55 is provided so as to be recessed from the upper surface 51a of the bottom wall portion 51, the protruding portion 56 protrudes toward the suction port 66 (see FIG. 1) from the facing portion 55.

With the configuration of the suction port 66 of the strainer 6 and the facing portion 55 of the oil pan 5 described above, even when the vehicle rides on a curb or the like to result in the oil pan 5 colliding and deforming, the opening area of the suction port 66 is guaranteed.

Figure 7:
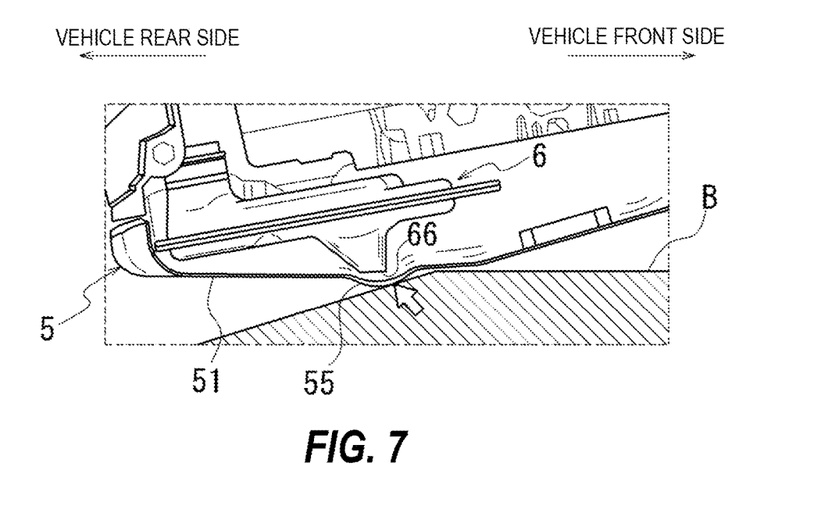
FIG. 7 is a diagram illustrating a state where a vehicle has ridden on a curb.

FIG. 7 is a diagram illustrating a state in which the vehicle has ridden on a curb B.

As illustrated in FIG. 7, when the vehicle rides on the curb B, for example, the bottom wall portion 51 of the oil pan 5 installed at the lower portion of the vehicle may collide with the curb B. The facing portion 55 bulging downward in the bottom wall portion 51 is particularly likely to come into contact with the curb B.

Figure 8A:
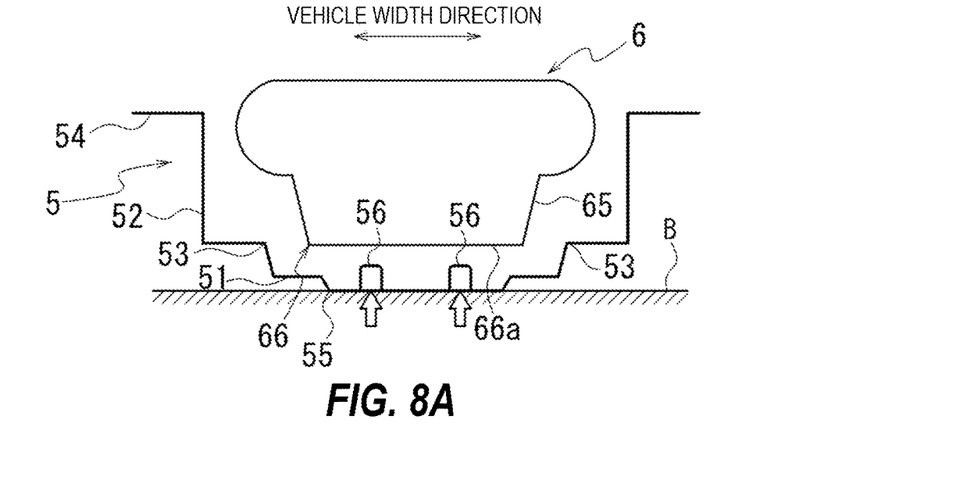
FIGS. 8A-8C are diagrams illustrating deformation of the strainer and the oil pan that has collided with the curb.
Figure 8B:
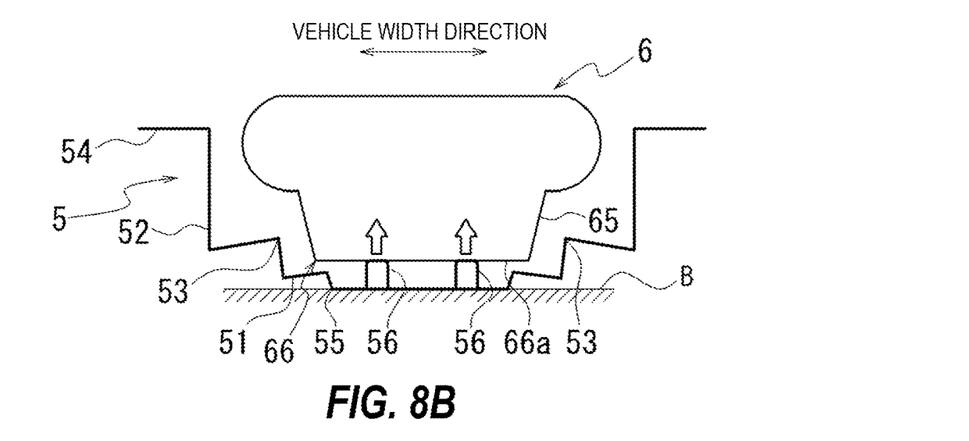
Figure 8C:
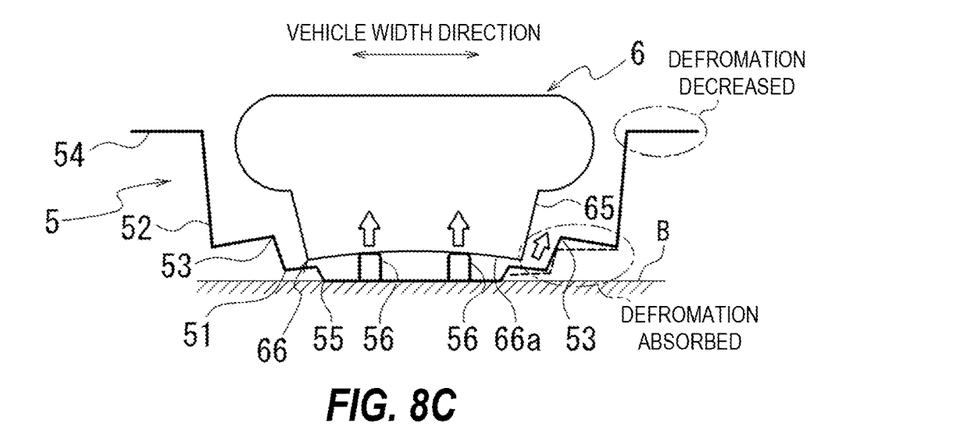

FIGS. 8A to 8C are diagrams illustrating the deformation of the strainer 6 and the oil pan 5 having collided with the curb B. Note that FIGS. 8A-8C are schematic views as viewed from the vehicle front side, with each part of the oil pan 5 and the strainer 6 illustrated in a simplified and exaggerated manner.

As illustrated in FIG. 8A, when the facing portion 55 of the oil pan 5 comes into contact with the curb B, a force is applied to push the facing portion 55 upward. When the vehicle rides on the curb B from the front side, as illustrated in FIG. 7, the force pushing up the facing portion 55 is applied obliquely upward from the front toward the rear of the vehicle.

As illustrated in FIG. 8B, the facing portion 55 pushed up by the curb B approaches the suction port 66 facing the facing portion 55 with a gap in between. The facing portion 55 is provided with the protruding portions 56, and the protruding portions 56 project upward in the facing portion 55, which bulges downward from the bottom wall portion 51 of the oil pan 5. Therefore, when the facing portion 55 approaches the suction port 66 that is pushed upward, the protruding portions 56 come into contact with the suction port 66.

When the protruding portions 56 come into contact with the suction port 66, the upward force applied from the curb B to the facing portion 55 is transmitted to the suction port 66 via the protruding portions 56, and as illustrated in FIG. 8C, the suction port 66 is pushed upward to be deformed. The protruding portions 56 push up the suction port 66 at two positions on both sides of the center C of the suction port 66 in the longer side direction. Thus, the suction port 66 is deformed so as to have a chevron shape as a whole, that is, the suction port 66 inclines downward toward both ends in the longer side direction with the central portion C in the longer side direction serving as the apex. Thus, the suction port 66 is pushed up by the protruding portions 56 and is pushed up in a direction away from the facing portion 55, whereby the distance between the suction port 66 and the facing portion 55 is maintained.

Figure 9:
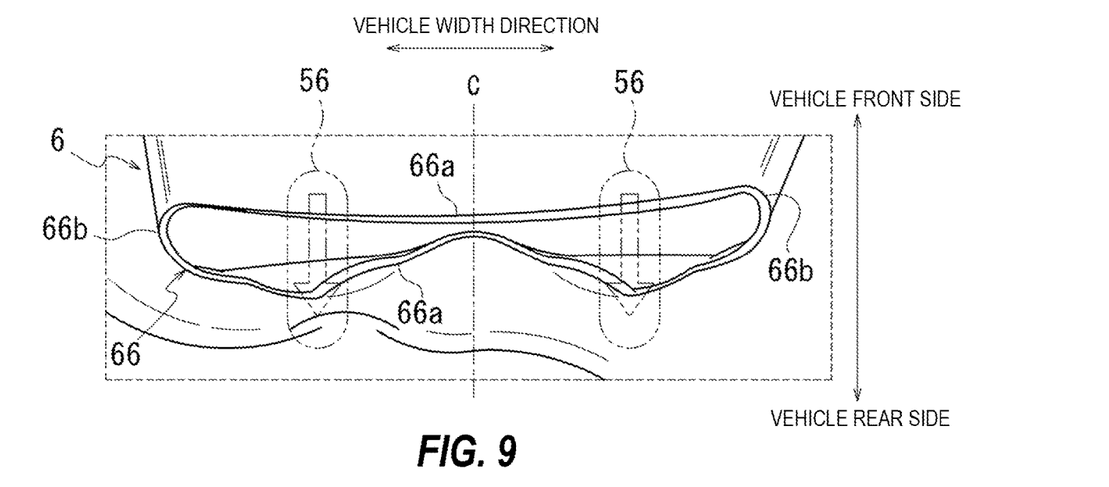
FIG. 9 is a diagram illustrating the deformed suction port as viewed from below.

FIG. 9 is a diagram illustrating the deformed suction port 66 as viewed from below. In FIG. 9, the upper side is the vehicle front side, the lower side is the vehicle rear side, and the protruding portions 56 in contact with the suction port 66 is illustrated with virtual lines. As described above, the force of the curb B pushing up the facing portion 55 of the oil pan 5 is applied obliquely upward from the front to the rear of the vehicle (see FIG. 7). Therefore, as illustrated with white arrows in FIG. 9, the suction port 66 is also deformed by being pushed up obliquely upward from the front to the rear of the vehicle by the protruding portions 56. Therefore, the suction port 66 is crushed at the center C in the longer side direction between the two protruding portions 56, but the suction port 66 is deformed so that the opening area is widened from the protruding portions 56 to both ends in the longer side direction. As a result, the opening area of the suction port 66 is guaranteed even when the deformation occurs.

Figure 10:
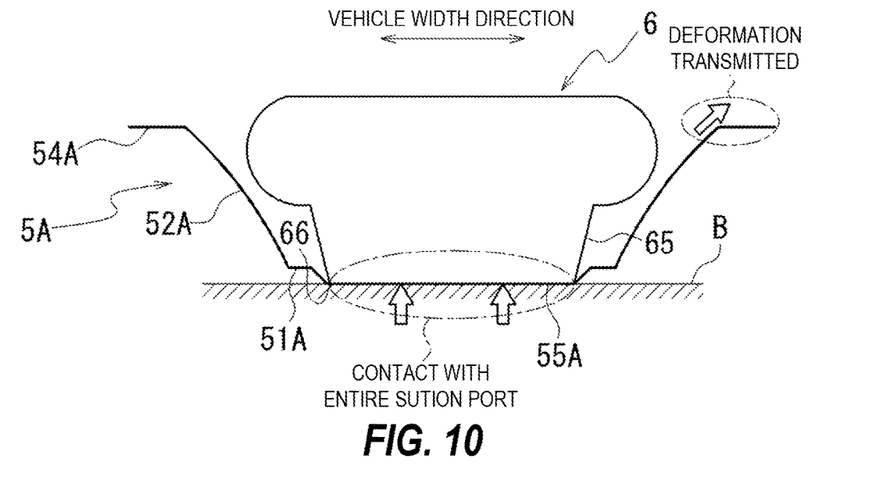
FIG. 10 is a diagram illustrating Comparative Example.

FIG. 10 is a diagram illustrating an oil pan 5A according to Comparative Example, and illustrates a case where the protruding portions 56 and the recessed portion 53 are not provided.

As illustrated in FIG. 10, when the protruding portions 56 are not provided on a facing portion 55A, the entire facing portion 55A pushed upward by the curb B comes into contact with the suction port 66, and the entire suction port 66 might be entirely crushed. Furthermore, the distance between the suction port 66 and the facing portion 55A might become small, rendering suction of the oil OL difficult.

In the embodiment, as illustrated in FIG. 8C, since the suction port 66 is deformed by being pushed up by the protruding portions 56, the opening area is secured and the distance from the facing portion 55 is also secured.

Furthermore, in the embodiment, the recessed portion 53 is provided near the lower end of the circumferential wall portion 52 of the oil pan 5. The deformation as a result of the collision between the curb B and the bottom wall portion 51 of the oil pan 5 is also transmitted to the circumferential wall portion 52 connected to the bottom wall portion 51. Still, the recessed portion 53 provided near the lower end of the circumferential wall portion 52 functions to absorb the deformation.

On the other hand, in Comparative Example illustrated in FIG. 10, the deformation is not absorbed by the recessed portion 53, and thus is likely to be transmitted to the upper end of a circumferential wall portion 52A. A flange 54A is formed at the upper end of the circumferential wall portion 52A of the oil pan 5A, to serve as a mating surface with the lower opening 41 (see FIG. 1) of the transmission case 1. When the flange 54A is deformed, the mating surface with the lower opening 41 might be displaced.

In the embodiment, as illustrated in FIG. 8C, with the recessed portion 53 provided between the bottom wall portion 51 and the upper end of the circumferential wall portion 52, displacement between the mating surfaces of the oil pan 5 and the transmission case 1 can be reduced. The deformation is also absorbed with the protruding portions 56 provided on the facing portion 55 of the bottom wall portion 51 coming into contact with the suction port 66, whereby the deformation of the flange 54 at the upper end is reduced.

As described above, the oil OL storage structure of the transmission case 1 of the embodiment includes (1) the oil pan 5 that closes the lower opening 41 of the transmission case 1 and forms the oil pool OP in the lower space inside the transmission case 1; and the strainer 6 having the suction port 66 for the oil OL located in the oil pool OP, wherein the suction port 66 for the oil OL is provided so as to face the bottom wall portion 51 of the oil pan 5 with a gap in between, and the bottom wall portion 51 of the oil pan 5 is provided with the protruding portions 56 protruding toward the suction port 66, with the protruding portions 56 being formed in a direction across the suction port 66 as viewed from the bottom wall portion 51.

A gap is provided between the bottom wall portion 51 of the oil pan 5 and the suction port 66 of the strainer 6, but when the oil pan 5 collides with, for example, a curb on the road surface or the like, the bottom wall portion 51 might deform to come into contact with the suction port 66 of the strainer 6, and thus the opening area of the suction port 66 might become small.

In the embodiment, the bottom wall portion 51 of the oil pan 5 is provided with the protruding portions 56 protruding toward the suction port 66, and the protruding portions 56 are also formed in a direction across the suction port 66. Therefore, when the bottom wall portion 51 is deformed, the protruding portions 56 protruding from the bottom wall portion 51 come into contact with the suction port 66 and push the suction port 66 upward to deform, whereby the suction port 66 is deformed in a direction away from the bottom wall portion 51. As a result, the distance between the suction port 66 and the bottom wall portion 51 is secured, and the opening area of the suction port 66 for sucking the oil OL can be secured.

(2) The bottom wall portion 51 of the oil pan 5 is provided with the facing portion 55 that faces the suction port 66 of the strainer 6 with a gap in between, and bulges in a direction away from the suction port 66. The protruding portions 56 are provided on the facing portion 55.

In order to reduce the air suction of the strainer 6, the suction port 66 needs to be located in the oil pool OP even if the oil OL in the valve chamber 4 moves due to a sudden start or acceleration of the vehicle. Therefore, the facing portion 55 of the bottom wall portion 51 of the oil pan 5 facing the suction port 66 of the strainer 6 bulges toward the outer side so that the oil pool OP can be deepened around the suction port 66. With the facing portion 55 bulging, the facing portion 55 has a higher possibility of coming into contact with a curb or the like. Still, with the protruding portions 56 provided to protrude toward the suction port 66 from the facing portion 55, the protruding portions 56 first come into contact with the suction port 66 when the deformation occurs and push up the suction port 66, whereby a distance between the suction port 66 and the facing portion 55 can be more easily secured.

(3) The suction port 66 has a rectangular shape, and has the long sides 66a (longitudinal side) extending in the vehicle width direction of the vehicle including the transmission case 1. The protruding portions 56 of the bottom wall portion 51 are formed across the suction port 66 in a short side 66b direction (shorter side direction) of the suction port 66 as viewed from the bottom wall portion 51.

Since the protruding portions 56 partially come into contact with the suction port 66 when the deformation occurred, even if the suction port 66 is partially crushed at the portion where the suction port 66 is in contact with the protruding portions 56, the opening area of the entire suction port 66 can be easily secured. Furthermore, since the protruding portions 56 are formed across the suction port 66, it is easy to apply a force evenly on the suction port 66, whereby the suction port 66 can be appropriately pushed up. The suction port 66 is not limited to a rectangular shape, and may have an oval shape.

(4) The protruding portions 56 of the bottom wall portion 51 are formed at positions on both sides of the center C of the suction port 66 in the longer side direction (center in the longitudinal direction) as viewed from the bottom wall portion 51, while each being separated from the center C in the longer side direction.

The protruding portions 56 arranged on both sides of the center C of the suction port 66 in the longer side direction push up and deform the suction port 66 about the center C in the longer side direction. Therefore, the suction port 66 is easily crushed at the center C in the longer side direction, but is deformed so that the opening area is widened from the portion in contact with the protruding portions 56 toward both ends. As a result, it is easy to secure the opening area of the suction port 66.

(5) The oil pan 5 includes the circumferential wall portion 52 connected to the bottom wall portion 51 at the lower end and connected to the lower opening 41 of the transmission case 1 at the upper end.

Between the bottom wall portion 51 and the upper end of the circumferential wall portion 52, the recessed portion 53 formed by depressing the wall surface of the circumferential wall portion 52 inward is provided.

If the deformation of the oil pan 5 due to the collision between a curb or the like and the bottom wall portion 51 reaches the upper end of the circumferential wall portion 52, the connection portion of the transmission case 1 with the lower opening 41 might be displaced and the rigidity may be compromised. With the recessed portion 53 at the lower end of the circumferential wall portion 52 connected to the bottom wall portion 51, the stress generated by the deformation of the bottom wall portion 51 is absorbed by the recessed portion 53. Thus, the deformation at the upper end is reduced and the displacement in the connection with the lower opening 41 can be suppressed, whereby a decrease in rigidity can be suppressed.

The embodiment of the present invention described above is merely illustration of a part of application example of the present invention and not of the nature to limit the technical scope of the present invention to the specific constructions of the above embodiment.

The present application claims a priority of Japanese Patent Application No. 2020-35544 filed with the Japan Patent Office on Mar. 3, 2020, all the contents of which are hereby incorporated by reference.

What is claimed is:

1. An oil storage structure of a transmission case, the oil storage structure comprising:
   an oil pan that closes a lower opening of the transmission case and forms an oil pool in a lower space inside the transmission case; and
   a strainer having a suction port for oil located in the oil pool, wherein
   the suction port for the oil is provided so as to face a bottom wall portion of the oil pan with a first gap in between;
   the bottom wall portion of the oil pan is provided with a protruding portion protruding toward the suction port, with the protruding portion being formed in a direction across the suction port as viewed from the bottom wall portion;
   the bottom wall portion of the oil pan is provided with a facing portion that faces the suction port of the strainer with a second gap in between, and bulges in a direction away from the suction port, thereby deepening the oil pool; and
   the protruding portion is provided on the facing portion, wherein the suction port has a rectangular shape or an oval shape, and has longitudinal sides extending in a vehicle width direction of a vehicle including the transmission case, and
   the protruding portion of the bottom wall portion is arranged across the suction port in a shorter side direction of the suction port as viewed from the bottom wall portion.

2. The oil storage structure of the transmission case according to claim 1, wherein the protruding portion of the bottom wall portion is formed at positions on both sides of a center of the suction port in a longitudinal direction as viewed from the bottom wall portion, while each being separated from the center in the longitudinal direction.

3. The oil storage structure of the transmission case according to claim 2, wherein
the oil pan includes a circumferential wall portion connected to the bottom wall portion at a lower end and connected to the lower opening of the transmission case at an upper end, and
between the bottom wall portion and the upper end of the circumferential wall portion, a recessed portion formed by depressing a wall surface of the circumferential wall portion inward is provided.

4. The oil storage structure of the transmission case according to claim 1, wherein
the oil pan includes a circumferential wall portion connected to the bottom wall portion at a lower end and connected to the lower opening of the transmission case at an upper end, and
between the bottom wall portion and the upper end of the circumferential wall portion, a recessed portion formed by depressing a wall surface of the circumferential wall portion inward is provided.

5. An oil storage structure of a transmission case, the oil storage structure comprising:
an oil pan configured to close a lower opening of the transmission case and to form an oil pool in a lower space inside the transmission case; and
a strainer having a suction port for oil located in the oil pool, wherein:
the suction port for the oil is provided so as to face a bottom wall portion of the oil pan with a first gap in between;
the bottom wall portion of the oil pan is provided with a protruding portion protruding toward the suction port, with the protruding portion being formed in a direction across the suction port as viewed from the bottom wall portion;
the suction port has a rectangular shape or an oval shape, and has longitudinal sides extending in a vehicle width direction of a vehicle including the transmission case; and
the protruding portion of the bottom wall portion is arranged across the suction port in a shorter side direction of the suction port as viewed from the bottom wall portion.

6. The oil storage structure of the transmission case according to claim 5, wherein the protruding portion of the bottom wall portion is formed at positions on both sides of a center of the suction port in a longitudinal direction as viewed from the bottom wall portion, while each being separated from the center in the longitudinal direction.

7. The oil storage structure of the transmission case according to claim 5, wherein
the oil pan includes a circumferential wall portion connected to the bottom wall portion at a lower end and connected to the lower opening of the transmission case at an upper end, and
between the bottom wall portion and the upper end of the circumferential wall portion, a recessed portion formed by depressing a wall surface of the circumferential wall portion inward is provided.

* * * * *